(12) United States Patent
Ekberg

(10) Patent No.: US 6,723,294 B2
(45) Date of Patent: Apr. 20, 2004

(54) OZONE GENERATOR

(75) Inventor: Kjell Ekberg, Stockholm (SE)

(73) Assignee: Otre AB, Stockholm (SE)

( * ) Notice: Subject to any disclaimer, the term of this patent is extended or adjusted under 35 U.S.C. 154(b) by 40 days.

(21) Appl. No.: 10/024,829

(22) Filed: Dec. 18, 2001

(65) Prior Publication Data
US 2003/0113243 A1 Jun. 19, 2003

(51) Int. Cl.[7] .................................................. B01J 19/08
(52) U.S. Cl. .............................. 422/186.18; 422/186.07
(58) Field of Search ..................... 422/186.07, 186.18

(56) References Cited
U.S. PATENT DOCUMENTS

| | | | |
|---|---|---|---|
| 4,666,679 A | 5/1987 | Masuda et al. | 422/186.2 |
| 4,816,229 A | 3/1989 | Jensen et al. | 422/186.2 |
| 4,892,713 A | 1/1990 | Newman | 422/186.07 |
| 4,960,570 A | 10/1990 | Mechtersheimer | 422/186.21 |
| 5,766,560 A | 6/1998 | Cole | 422/186.18 |
| 2001/0046459 A1 * | 11/2001 | St. Onge et al. | 422/186.11 |

* cited by examiner

*Primary Examiner*—Steven Versteeg
(74) *Attorney, Agent, or Firm*—Jenkens & Gilchrist, P.C.

(57) ABSTRACT

An ozone generator includes a dielectric member having first and second faces, a first electrode provided on the first face of the member, and a second electrode provided on the second face of the member. The first electrode can be an electrically conductive plate, having a first and a second face. It is provided with at least one elongated recess in the first face. The first face is in contact with the first face of the dielectric member, such that the recess(es) and the dielectric member define channels in cooperation with the dielectric plate.

17 Claims, 6 Drawing Sheets

OZONE GENERATOR

The present invention relates to a device for the production of ozone.

BACKGROUND OF THE INVENTION

Ozone, also referred to as "activated oxygen", is an allotropic form of oxygen, and is one of the strongest oxidants. Ozone can be produced by silent electrical discharge, by connecting a AC high-voltage, high-frequency power supply across two electrodes and passing an oxygen-containing gas, for example air or pure oxygen, between the electrodes. As the air passes between the electrodes, some of the oxygen molecules are excited to produce ozone molecules.

Ozone is an effective disinfecting and deodorizing agent. Ozone is capable of killing bacteria by braking up their molecular structure. Thus, where unpleasant or harmful smells are caused by noxious airborne chemicals and by surface bacteria, the ozone kills the bacteria and breaks down the molecular structures of the chemicals, thus disinfecting and deodorizing. Even at a low level of 0.1 parts per million, ozone is an effective bactericide. Because ozone is unstable, the ozone decomposes to oxygen leading no residues to further eliminate. Ozone can also be used to sterilize water by the dissolution of ozone in it.

Commercial devices for producing ozone, typically for disinfecting and deodorizing are well known.

U.S. Pat. No. 5,766,560 (Cole) discloses an ozone generator, one embodiment of which exhibits a relatively good efficiency in ozone generation, at least when fed with pure oxygen. It comprises a plurality of wires stretched across the surface of a ceramic plate, e.g. of alumina. The opposite surface of the ceraminc plate is coated with metal to form an electrode. A high voltage applied across the ceramic between the wires and the metal coating will cause a corona discharge to occur at the wire.

This design, although fairly efficient, is tedious to assemble in view of the many wires required that must be attached and positioned correctly.

SUMMARY OF THE INVENTION

Thus, there is a need in the art for an efficient ozone generator that can be easily assembled using as few components as possible.

Such a need is met by the novel and inventive ozone generator as defined in the appended claims.

In particular it comprises a dielectric member having first and second faces; a first electrode provided on the first face of said dielectric member; a second electrode provided on the second face of said dielectric member; wherein the first electrode is made of an electrically conductive material, having a first and a second face, and wherein the first face of the first electrode and the first face of the dielectric member are structured so as to define at least one channel between them, said channel(s) extending in a defined pattern between said dielectric member and said first electrode.

In a particular embodiment the ozone generator comprises a flat dielectric plate having first and second faces; a first electrode provided on the first face of said plate; a second electrode provided on the second face of said plate; connectors for coupling said electrodes to a voltage source; wherein the first electrode is an electrically conductive plate, having a first and a second face, and having at least one elongated recess in said first face, said first face being in contact with said first face of said dielectric plate, such that said recesse(s) and said dielectric plate define channels in cooperation with said dielectric plate.

Thus, the object of simplifying the construction is achieved by providing a plurality of corona discharge sites or surfaces in a unitary structure in the form of a metal member and a dielectric member which in cooperation define a plurality of gas channels. The channels, being narrow and elongated provide a high concentration of corona discharges in a fairly restricted volume, thus producing a high yield of ozone per unit volume of air or oxygen introduced in said volume. Thereby the efficiency of ozone generation is increased.

The provision of a single, unitary, multi-channel structure wherein the ozone is generated, enables a drastically simplified manufacturing or assembling of the generator as a whole.

Preferred embodiments are defined in the dependent claims.

BRIEF DESCRIPTION OF THE DRAWINGS

Embodiments of the invention will be described in detail below with reference to the drawings in which.

FIG. 2b shows in detail gas channels in the embodiment of FIG. 2a;

DETAILED DESCRIPTION OF THE INVENTION

Figure 1B:
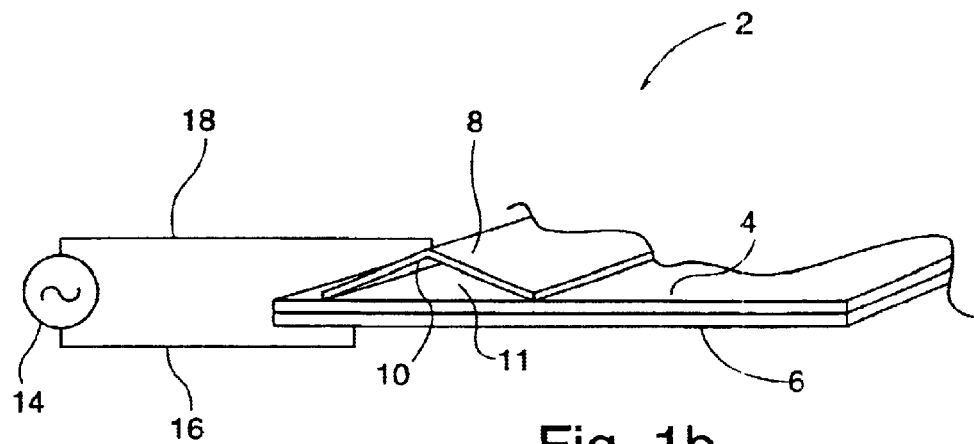
FIG. 1b illustrates a generic embodiment of the invention.
Figure 1A:
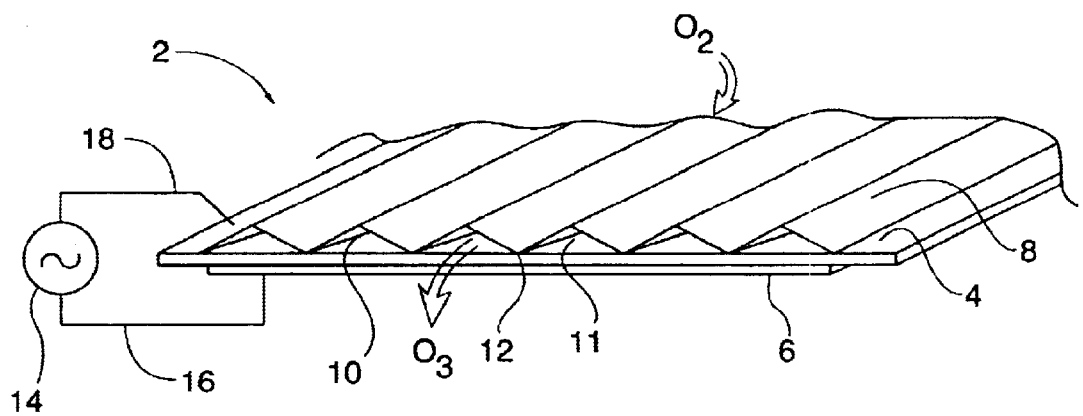
FIG. 1a illustrates a first embodiment of the inventive ozone generator.

FIG. 1a shows a first embodiment of an ozone generator according to the invention, generally designated with reference numeral 2.

It comprises a base member, suitably in the form of a plate 4, made of a dielectric material, such as ceramic. Suitable materials are e.g. alumina, but other materials, such as glass are also possible. The base plate has a first (upper in the figure) and a second (bottom) surface. The second (bottom) surface is in contact with an electrically conductive member 6, suitably in the form of a metal foil or plate placed in close vicinity to, preferably in contact with said second surface. Alternatively, the conductive member 6 can be provided as a metal coating on said dielectric plate, suitably by electroplating, deposition, sintering or any other suitable technique. This metal foil or coating 6 constitutes one electrode. Suitable metals are selected from iron, (stainless (steel (SS2343 or 316L being exemplary), tungsten (W) and titanium (Ti), although any other metal meeting the physical requirements is usable. Other conductive materials such as conductive polymers are possible provided the physical properties, such as mechanical strength etc., required for application as an electrode, are met.

On the first (upper) surface a metal plate 8, is located. The metal plate is pleated or corrugated so as to comprise a plurality of longitudinal "grooves" or "recesses" 10, with dividing ridges 12 therebetween. The metal plate 8 is clamped to the dielectric base plate 4 by some suitable means (not shown) in order to provide a (preferably) leak tight contact between the base plate and the dividing ridges 12. The clamping can be provided by the action of an enclosing housing, that will act to clamp the plate 8 to the base plate 8 when assembled. Thereby the grooves or ridges 10 form channels 11. This metal plate 8 constitutes another electrode. The metal plate 8 will be referred to as the first electrode, and the foil or coating 6 will be referred to as the second electrode.

A high AC voltage source 14 is coupled so as to supply a high voltage across the electrodes 6 and 8, respectively, via electrical leads 16 and 18 respectively.

FIG. 1b illustrates a generic embodiment of the invention, comprising a metal plate 8 that has been bent along one single line in the longitudinal direction so as to form one single recess 10, and thus one single channel 11. All other elements are identical to the elements of FIG. 1a.

If air or some oxygen containing gas, or pure oxygen is caused to flow through the channels 11 (indicated by bold arrows) by some suitable means (not shown), and a high voltage is applied across the dielectric plate 4, a corona discharge will occur, and will cause some of the oxygen in the gas passing through the channels to be converted into ozone according to the reaction $$3O_2 \rightarrow 2O_3$$

Depending on i.a. gas flow rates and corona discharge rates (and of course the oxygen concentration in the feed gas), varying concentrations of ozone will be obtained at the outlet end of the channels.

Figure 1C:
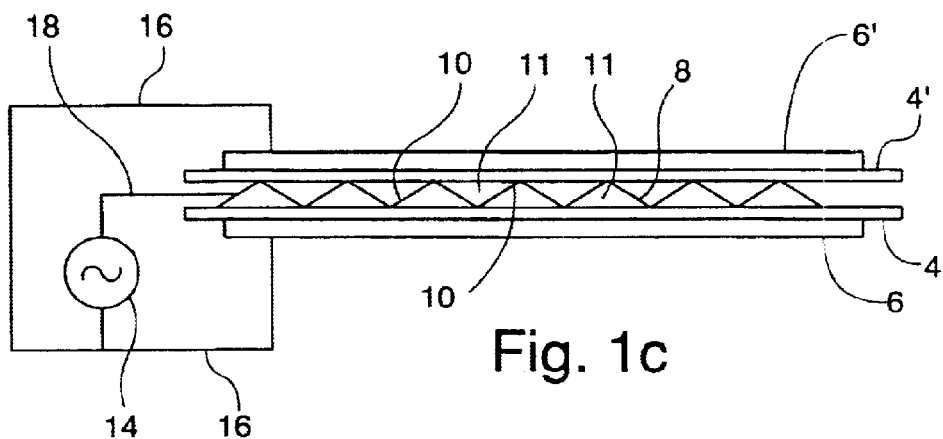
FIG. 1c illustrates a sandwiched embodiment of the invention.

In order to improve the efficiency of an ozone generator according to the invention, a double or "sandwich" type structure as shown in FIG. 1c can be made. Here, the corrugated or pleated metal plate 8, is placed between two dielectric plates 4, 4', each being provided with electrodes, 6, 6' whereby the longitudinal grooves or "pleats" 10 in the metal plate 8 form alternating channels 11.

Figure 2A:
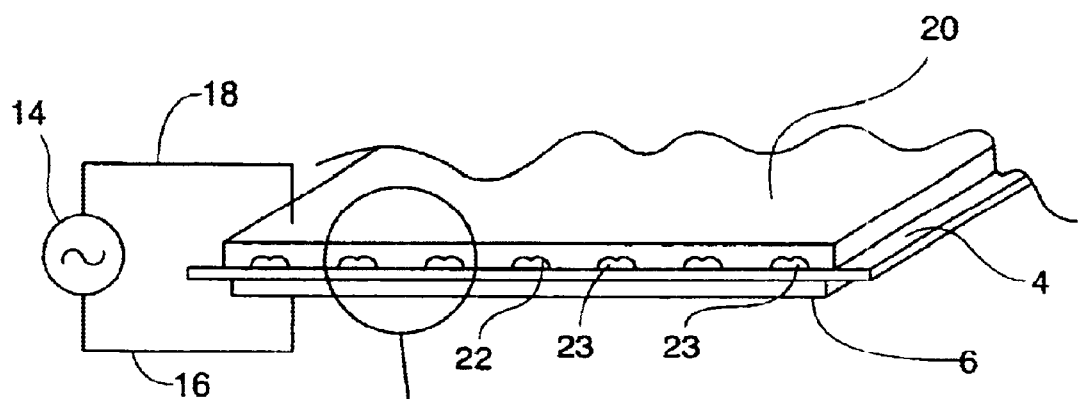
FIG. 2a illustrates a second embodiment of the inventive ozone generator.

FIG. 2a illustrates a second embodiment of the invention. Similar elements have been given the same reference numerals as the enbmodiment in FIGS. 1a–c.

It comprises the same base structure, namely a base plate 4, having a first (upper in the figure) and a second (bottom) surface. The second (bottom) surface is in contact with an electrically conductive member 6 in the form of a metal foil placed in close vicinity to, preferably in contact with said second surface. Alternative, the conductive member 6 can be provided as a metal coating on said dielectric plate, suitably by electroplating, deposition, sintering, etching or any other suitable technique.

This metal foil or coating 6 constitutes a second electrode, in analogy to the embodiments of FIGS. 1a–c.

On the upper surface of the dielectric plate 4, a metal plate 20 is placed. The plate 20 had been provided with elongated recesses 22, suitably by etching or some abrasive method (etching, laser based ablation etc.), by which controlled cross sections of the recesses can be obtained. Sintering in a suitable mold or extrusion (e.g. Al) can also be used.

By "elongated recess" we mean a recess or groove that has a spatial extension over a surface, be it along a straight line or in some other geometrical pattern, such as a "zig-zag" shape, a spiral shape, a meandering shape or any other possible configuration that gives a sufficiently long channel in which the desired conversion from oxygen to ozone can take place with some degree of efficiency.

This plate 20 constitutes a first electrode, in analogy with the embodiments of FIGS. 1a–c.

Figure 2B:
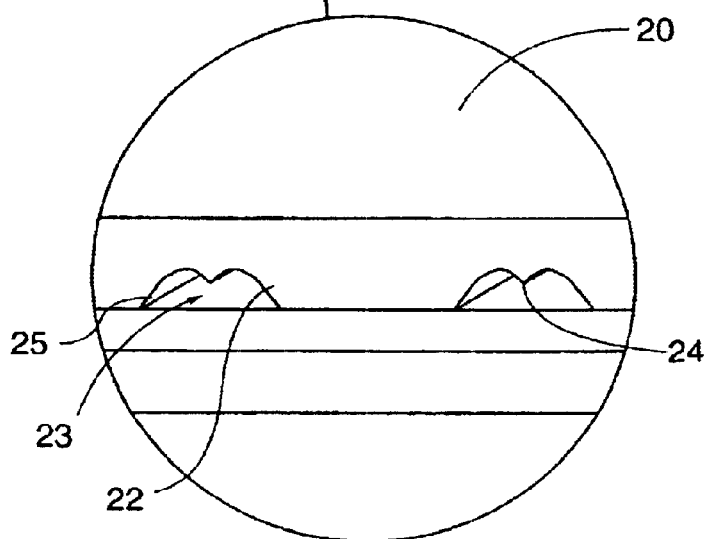

In FIG. 2b the specific cross-section of the recesses 22 of the second embodiment can be clearly seen. The recesses have what could be referred to as a "double arch" profile, basically two semi-circular grooves that have been made so as to overlap, whereby a centrally located, sharp ridge 24 is created, which runs in the longitudinal direction of the recesses 22.

As can be seen, the metal plate 20 is arranged in contact with the dielectric plate 4 such that the recesses 22 face the dielectric plate. Thereby channels 23 form, in a manner similar to the embodiment of FIG. 1. However, as will be explained below, it is believed that these channels 23 formed by the recess 22 and the face of the dielectric plate 4 in cooperation are more efficient for the purpose of generating ozone than the channels 11 of the embodiments of FIGS. 1a–c.

Like in FIGS. 1a–c, a high voltage is applied to the electrode 6 and 20, respectively, via electrical leads 16 and 18, respectively, which are connected to an AC high voltage source 14.

Figure 3:
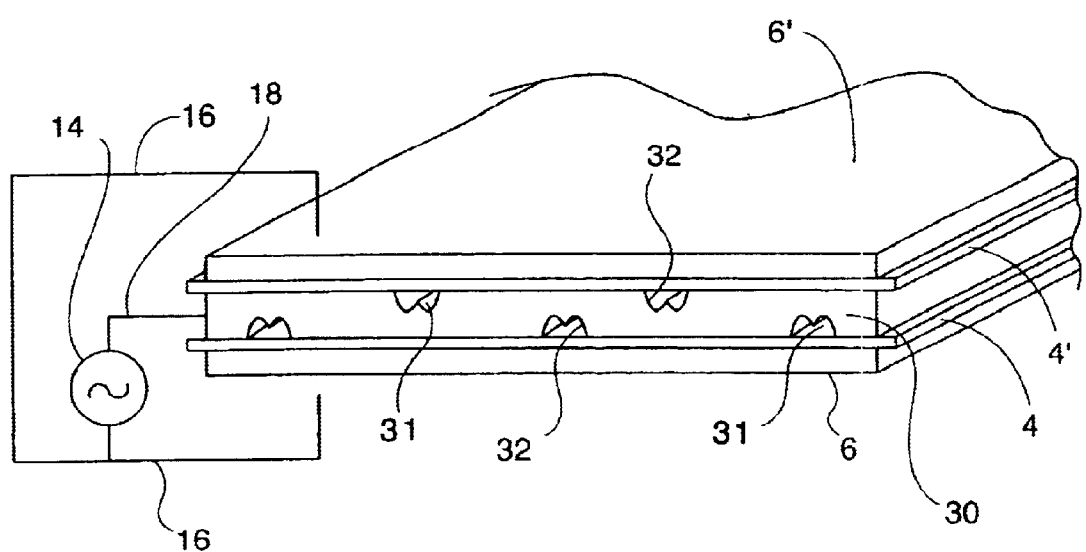
FIG. 3 illustrates a third embodiment of the inventive ozone generator.

FIG. 3 there is illustrated an embodiment having a double sided electrode plate 30 with recesses 32 forming channels 31 on both sides, and in the illustrated embodiment, arranged in an alternating fashion. Here, the electrode plate 30 is sandwiched between two dielectric plates 4, each provided with an electrode layer 6, in the same manner as in the embodiments of FIGS. 1a–c and 2a–b.

Suitably the voltage source 14 delivers an AC voltage of 2–8 kV at a frequency of 15–30 kHz. A known commercial device operates a 4 kV and 21 kHz, respectively The dimensions of the channels are not strictly critical to the invention, but for purposes of incorporation into medical equipment, the overall sizes should be kept as small as possible, without compromising the output efficiency of the device.

Thus, for a typical implementation in a sterilization equipment for the treatment of e.g. surgical instruments, it would be desirable to obtain at least 4 g/h ozone at a concentration of 100 g/m$^3$. An operating range is suitable 1–10 g/h at the mentioned concentration.

In the embodiments of FIGS. 2 and 3, the channels 23, 31 can be made to exhibit various different geometrics, the one specifically shown in FIG. 2b being only an example.

For instance it is possible to make the channels such that there is a smoother transition between the surface of the dielectric plate and the channel walls 41, i.e. the channel wall 41 contacts the surface under an acute angle, as opposed to the embodiment of FIG. 2b, where there is a rather abrupt transition, e.g. approximately a 80–90° angle between wall and surface.

Figure 4A:
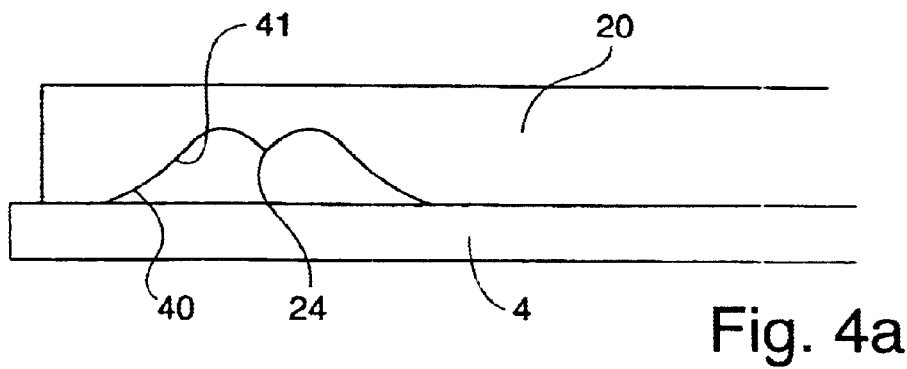
FIGS. 4a–j illustrates alternative geometries of the channels.

FIG. 4a shows a possible variation. It comprises a "double arch" type channel, similar to FIG. 2b, but having rounded off portions 40 in the area of contact between dielectric plate 4 and metal plate 20. Thus, there is created a wedge like space or nook in the channel in the region of contact between metal plate 20 and dielectric plate 4. In this particular embodiment, the channel connects to the dielectric plate at a "zero" angle.

Figure 4B:
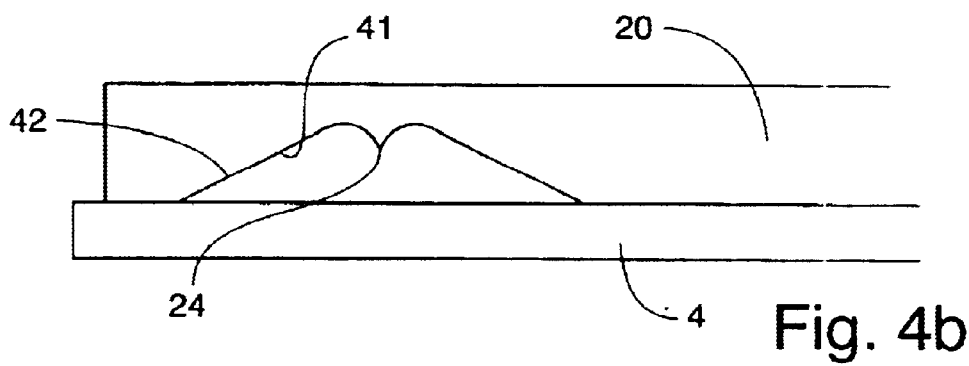
Figure 4C:
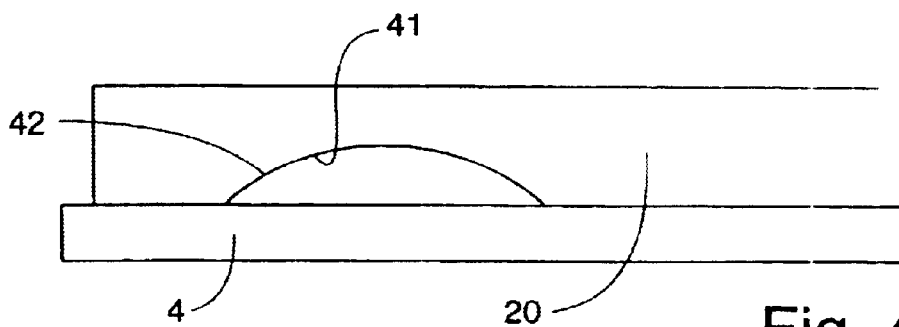
Figure 4D:
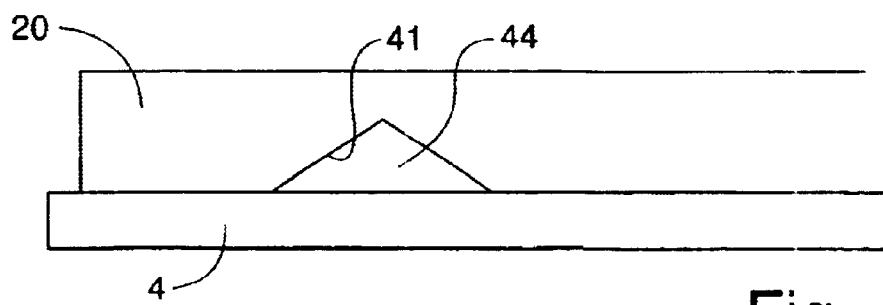
Figure 4E:
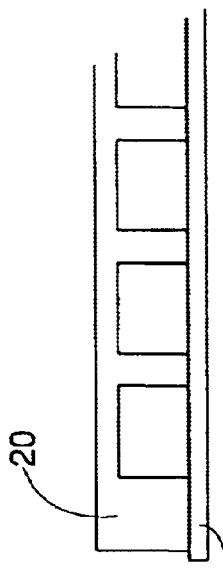

Various other possible geometries are shown in FIGS. 4b–d. FIG. 4b illustrates a case wherein the wall is not rounded off, but simply comprises a straight, or essentially planar portion 42 connecting to the surface of the dielectric plate under an acute angle.

The embodiment of FIG. 4c is essentially the same as the embodiment of FIG. 4b, but without the centrally extending ridge 24.

Finally, FIG. 4d illustrates a variation similar to embodiment of FIG. 1, but instead of the corrugated plate 8, there is an essentially planar plate in which "V"-grooves or recesses 44 have been made.

In FIGS. 4c–j a number of additional possible configurations and change geometries are shown. The basic components common to the various embodiments have been designated with the same reference numerals.

Figure 4F:
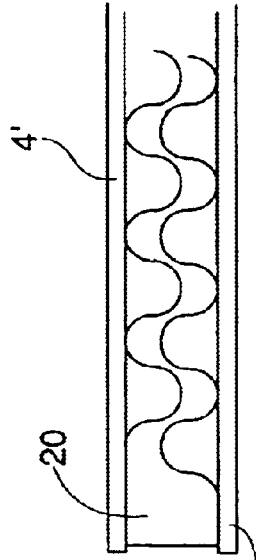
Figure 4G:
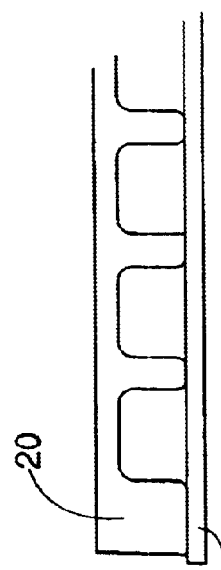
Figure 4H:
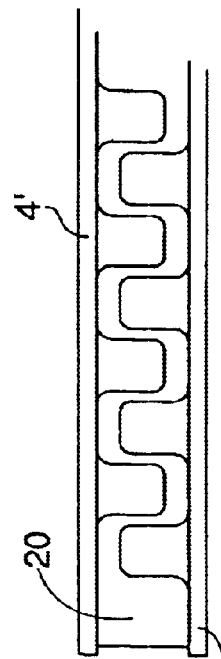
Figure 4I:
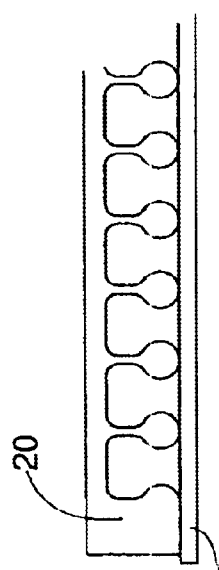
Figure 4J:
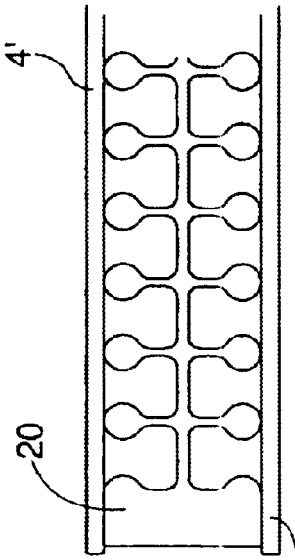

FIGS. 4c, g and i represent structures for a single side embodiment, whereas FIGS. 4f, h and j represent structures suitable for a sandwich type embodiment (only the dielectric plates 4, 4' are shown for simplicity).

Of course all of the different channel structures disclosed in FIGS. 4a–d can be arranged as a sandwich structure similar to the one shown in FIG. 3, the requirement being that the recesses or grooves forming the channels are provided on both sides of a metal plate. Also, the lay-out of channels over the plate can be varied, but it is believed that the alternating fashion shown in FIG. 3 is optimal i.a. from a mechanical strength point of view.

Without wishing to bound by theory, we believe that the corona discharge occurs either at the ridges 24, or in the region of the channels 22 close to the dielectric plate upper surface, namely in the area shown by reference numeral 25 in FIG. 2b, or in the region with rounded off parts 40 in FIG. 4a.

Figure 5A:
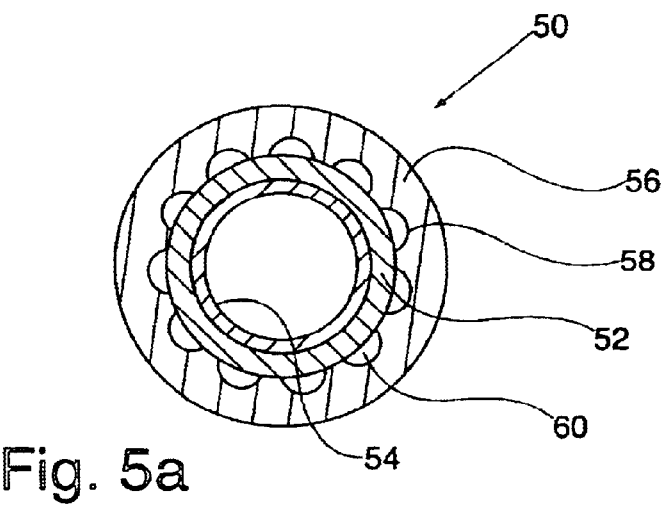
FIG. 5a shows a tubular embodiment of the generator according to the present invention.

In FIG. 5a a further embodiment, generally designated 50, of the generator according to the present invention is shown.

It has a circular cross section, and comprises a member in the form of a tube 52 of a dielectric material, the inner side of which is provided with a coating 54 of a conductive material, e.g. a metal, constituting a second electrode, in analogy with the embodiments of FIGS. 1a–c. Instead of a coating, the electrode can be provided by inserting a metal tube into the dielectric tube 52, preferably in contact with the inner wall of the tube 52.

An outer tube 56 of a conductive material, preferably a metal, is provided over the dielectric tube 52, thereby constituting a first electrode, in analogy with the embodiments of FIGS. 1a–c. This tube 56 is provided with recesses 58 on the inner wall of the tube 58. These recesses 58 define channels 60 together with the outer periphery of the dielectric tube 52, in the same manner as disclosed for the previously described embodiments.

This embodiment has certain potential advantages over the flat configuration, in that sealing could be easier to achieve at the inlet and outlet, respectively.

Figure 5B:
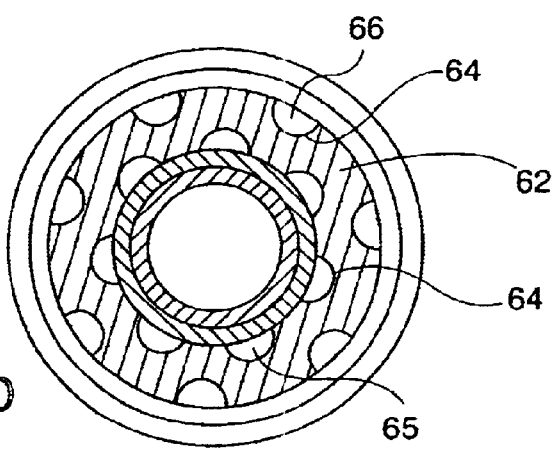
FIG. 5b shows a tubular sandwich embodiment of the generator according to the present invention.

FIG. 5b shows a double or "sandwich" configuration of the tubular embodiment of the generator.

In this embodiment the tube 62 constituting an electrode, and corresponding to tube 56 of FIG. 5a, is provided with recesses 64 on both the inner and outer periphery. An additional tube 66 of a dielectric material is provided onto the conductive tube 62 so as to define a further plurality of channels 66, in addition to channels 65, corresponding to channels 60 of FIG. 5a.

In principle multiple sandwich structures can be made, by providing alternating conductive and dielectric tubes to a desired number of layers.

A variation, also within the inventive concept, is to provided the recesses forming gas channels in the dielectric plate instead of in the metal plate. This will not substantially alter the overall design of the generator, but could have certain advantages from a manufacturing point of view, in that ceramic plates can easily be made e.g. by sintering, to exhibit very complex structures.

Figure 6:
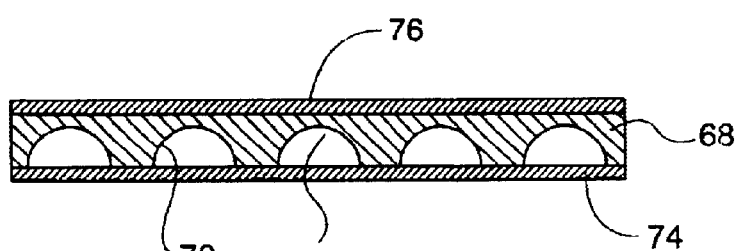
FIG. 6 shows an embodiment in which the dielectric member provides the recesses forming gas channels.

Such an embodiment is schematically illustrated in FIG. 6, wherein the dielectric plate 68 is shown to exhibit semi circular recesses 70 forming channels 72 in cooperation with a first metal plate 74, constituting an electrode, and wherein the dielectric plate 68 is provided on its upper side with a coating 76 forming a second electrode. This second electrode could alternatively be a metal plate placed in close contact with the dielectric plate 68. This embodiment is shown as a flat embodiment, but of course the principle of FIG. 6 is equally applicable to the tubular embodiment of FIGS. 5a and 5b.

Figure 7:
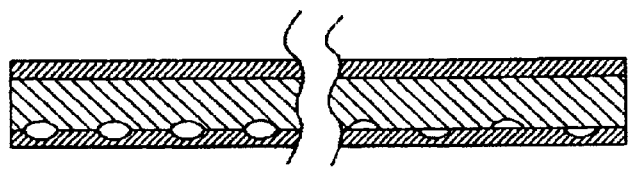
FIG. 7 schematically illustrates a further variation of channel structure.

FIG. 7 schematically illustrates still a further embodiment of the channel structure. The left hand part of the figure illustrates recesses in both the dielectric member and the metal member, where a recess in the metal and a recess in the dielectric together form a channel. The right hand part of the figure on the other hand illustrates a structure where recesses are alternatively formed in the metal and the dielectric, respectively, for form channels.

Further modifications and variations of the invention, such as the provision of arcuate, arched, curved or bent members for the electrodes and dielectric members, respectively, are within the competence of the skilled man, and the illustrated embodiments are not to be construed as limiting on the inventive concept.

What is claimed is:

1. An ozone generator, comprising
    a dielectric member having first and second faces;
    a first electrode provided on the first face of said dielectric member, wherein the first electrode is in contact with the first face of the dielectric member;
    a second electrode provided on the second face of said dielectric member, wherein the second electrode is in contact with the second face of the dielectric member; and
    wherein the first electrode is made of an electrically conductive material, having a first and a second face, and wherein the first face of the first electrode and the first face of the dielectric member are structured so as to define at least one channel between them, said channel(s) extending in a defined pattern between said dielectric member and said first electrode.

2. An ozone generator as claimed in claim 1, wherein said first electrode has at least one elongated recess in said first face of said first electrode said first face of said first electrode being in contact with said first face of said dielectric member, such that said recess(es) and said dielectric member define channels in cooperation.

3. An ozone generator as claimed in claim 1, wherein said dielectric member has at least one elongated recess in said first face of said dielectric member, said first face of said dielectric member being in contact with said first face of said first electrode, such that said recess(es) and said first electrode define channels in cooperation.

4. An generator as claimed in any preceding claim, wherein the second electrode is a conductive plate or foil placed in contact with the second face of the dielectric member.

5. An ozone generator as claimed in claim 1, wherein said dielectric member(s) and said electrodes are arcuate, arched, curved or bent.

6. An ozone generator as claimed in claim 1, wherein the second electrode is a coating provided on the dielectric member second face.

7. An ozone generator as claimed in claim 1, wherein the metal for the electrodes comprises at least one of iron, steel, tungsten, titanium, or alloys thereof.

8. An ozone generator as claimed in claim 1, wherein the first electrode comprises a corrugated or pleated conductive plate.

9. An ozone generator as claimed in claim 1, wherein said recesses extend across a surface at a finite spacing between them.

10. An ozone generator as claimed in claim 1, wherein said recesses have a cross section geometry that provides sites for corona discharge to occur when a AC high voltage is applied to said electrodes.

11. An ozone generator as claimed in claim 10, wherein said corona discharge sites comprise a sharp ridge.

12. An ozone generator as claimed in claim 11, wherein said sharp ridge is provided by shaping the recess geometry as two overlapping semi-circles, the intersection of which generates said ridge, which extends in the longitudinal direction of the recess.

13. An ozone generator as claimed in claim 10, wherein said corona discharge sites comprise a rounded off corner in the vicinity of the surface of said first electrode, providing a nook between the dielectric member and the first electrode.

14. An ozone generator as claimed in claim 1, comprising a second dielectric member contacting the second face of said first electrode, and wherein said first electrode comprises at least one recess in both the first and the second face thereof, said second dielectric member comprising a third electrode provided on that face of the second dielectric member that is not in contact with said second face of said first electrode.

15. An ozone generator as claimed in claim 1, wherein said dielectric member(s) and said electrodes are essentially flat.

16. An ozone generator as claimed in claim 1, wherein said dielectric member(s) and said electrodes are tubular.

17. An ozone generator, comprising a flat dielectric plate having first and second faces;

a first electrode provided on the first face of said dielectric plate, wherein the first electrode is in contact with the first face of the dielectric plate;

a second electrode provided on the second face of said dielectric plate, wherein the second electrode is in contact with the second face of the dielectric plate;

connectors for coupling said electrodes to a voltage source; and wherein the first electrode has at least one elongated recess in said first face, such that said recess(es) and said dielectric plate define channels in cooperation with said dielectric plate.

* * * * *